United States Patent [19] [11] 3,796,920

Hedrick et al. [45] Mar. 12, 1974

[54] ARRANGEMENT FOR A REPEATERED POWER LINE CARRIER SYSTEM THAT PROVIDES PROTECTIVE RELAYING

[75] Inventors: Donald L. Hedrick, Madison Heights; Elgie W. Wilmoth, Jr., Lynchburg, both of Va.

[73] Assignee: General Electric Company, Lynchburg, Va.

[22] Filed: June 20, 1973

[21] Appl. No.: 371,835

[52] U.S. Cl. .............................. 317/28 R, 317/29 R
[51] Int. Cl. .......................... H02h 3/28, H02h 3/30
[58] Field of Search .... 317/28 R, 28 B, 29 A, 29 B, 317/29 R; 179/170

[56] References Cited

UNITED STATES PATENTS

| | | | |
|---|---|---|---|
| 2,873,410 | 2/1959 | Hodges | 317/28 R |
| 3,176,190 | 3/1965 | Hodges | 317/29 R X |
| 3,566,046 | 2/1971 | McCormick et al. | 179/170 |
| 3,457,508 | 7/1969 | Rowlands et al. | 179/170 X |
| 3,697,810 | 10/1972 | Wilson et al. | 317/29 X |

OTHER PUBLICATIONS

Fitzgerald, "Carrier–Current Pilot System," A.I.E.E., October 1927, pages 1015–1021.

*Primary Examiner*—J. D. Miller
*Assistant Examiner*—Patrick R. Salce

[57] ABSTRACT

In power line carrier systems, repeaters are provided at station or switchyard locations between line sections to transmit signals in both directions around the location. In some systems tones are transmitted to provide protective relaying. In such cases, it is desirable or essential that the tones be restricted to the desired line sections and not be transmitted by the repeaters to further line sections so that proper protective relaying is provided. A circuit arrangement is provided to block the repeaters at each location, either in response to a tone from a distant location or in response to a tone being produced at the one location for transmission to a distant location, and thus provide proper protective relaying.

1 Claim, 4 Drawing Figures

ARRANGEMENT FOR A REPEATERED POWER LINE CARRIER SYSTEM THAT PROVIDES PROTECTIVE RELAYING

BACKGROUND OF THE INVENTION

Our invention relates to repeatered power line carrier systems that provide protective relaying, and particularly to an arrangement that blocks the repeaters in response to relaying tones and thus prevents erroneous operation of the protective relaying.

Carrier systems operated on 60 Hz (or other power frequency) transmission lines are referred to as power line carrier systems. Such power line carrier systems are very desirable, since they provide communication, signaling, and relaying with a high degree of reliability, or they provide communication, signaling, and relaying to transmission line locations which are not accessible to other communication media. The relaying function is used to protect the transmission line against faults, such as grounds or short circuits. Because of the great reliance placed on electrical power, only that portion or section of a transmission line having a ground or fault should be removed from service, and the remainder of the line should be kept operating to provide power to as many locations as possible.

Accordingly, a general object of our invention is to provide a new and improved power line carrier system for protective relaying.

In power line carrier systems, repeaters are used between line sections to provide communication between the sections. However the tones or signals used for protective relaying should be restricted to predetermined, desired line sections so that protective relaying occurs only in the line sections which require it.

Accordingly, a more specific object of our invention is to provide a new and improved power line carrier system which prevents protective relaying tones from being transmitted from one line section through a repeater to another line section.

SUMMARY OF THE INVENTION

Briefly, these and other objects are achieved in accordance with our invention by a control switch which has the capability of blocking a power line carrier repeater in response to one of several signals. These signals include the receipt of a protective relaying tone over any of the repeatered line sections, or the generation of a protective relaying tone at the repeater location for transmission over any of the line sections. Any signal indicating generation of a tone for transmission over a line section or indicating receipt of a protective relaying tone from a line section will cause the repeater to be blocked. Thus, protective relaying tones are restricted to the proper line sections, and erroneous protective functions are kept from occurring.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENT

Figure 1A:
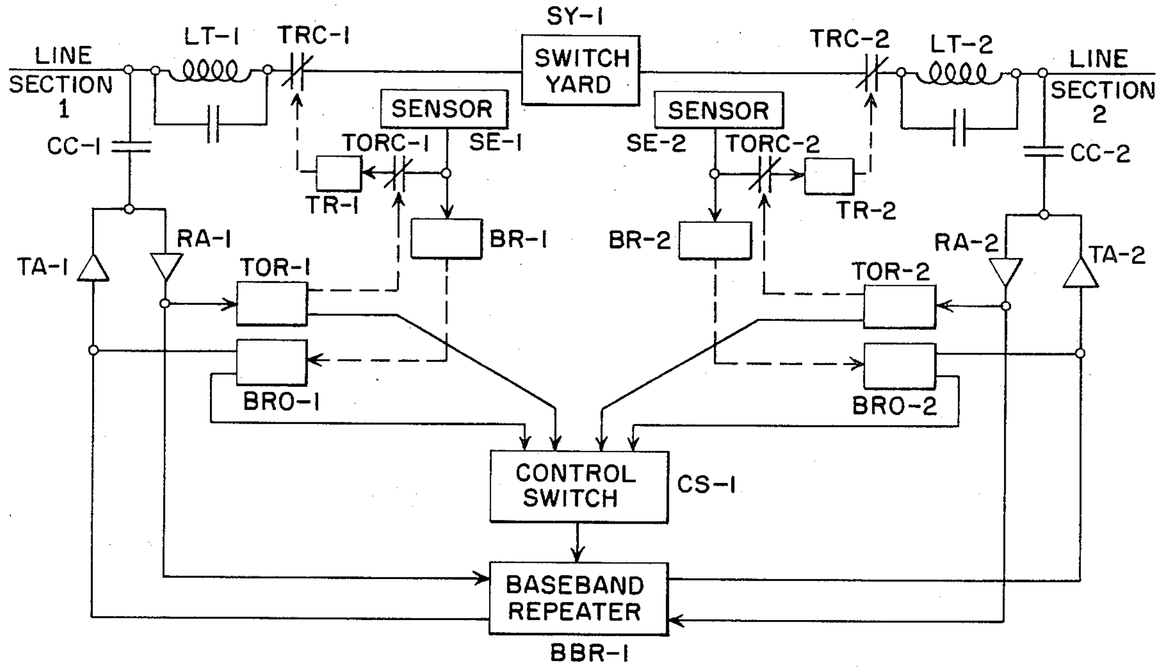
FIGS. 1*a*, 1*b*, and 1*c* show a block diagram of three power line locations having a repeatered carrier system utilizing a control switch in accordance with our invention.
Figure 1B:
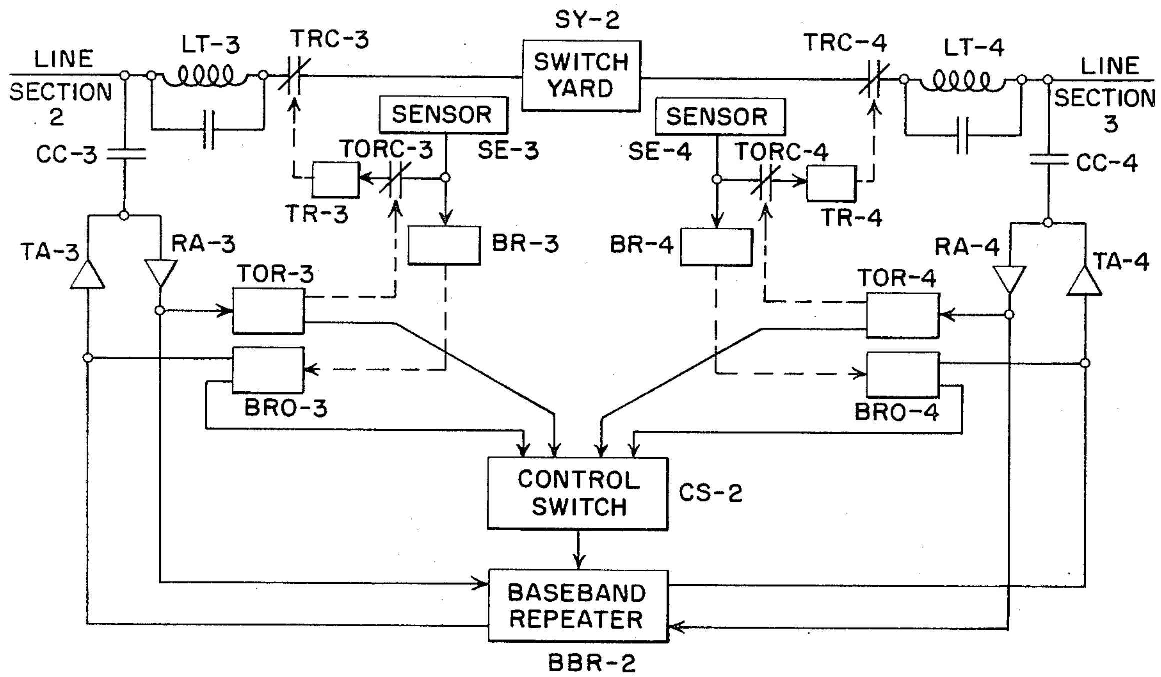
Figure 1C:
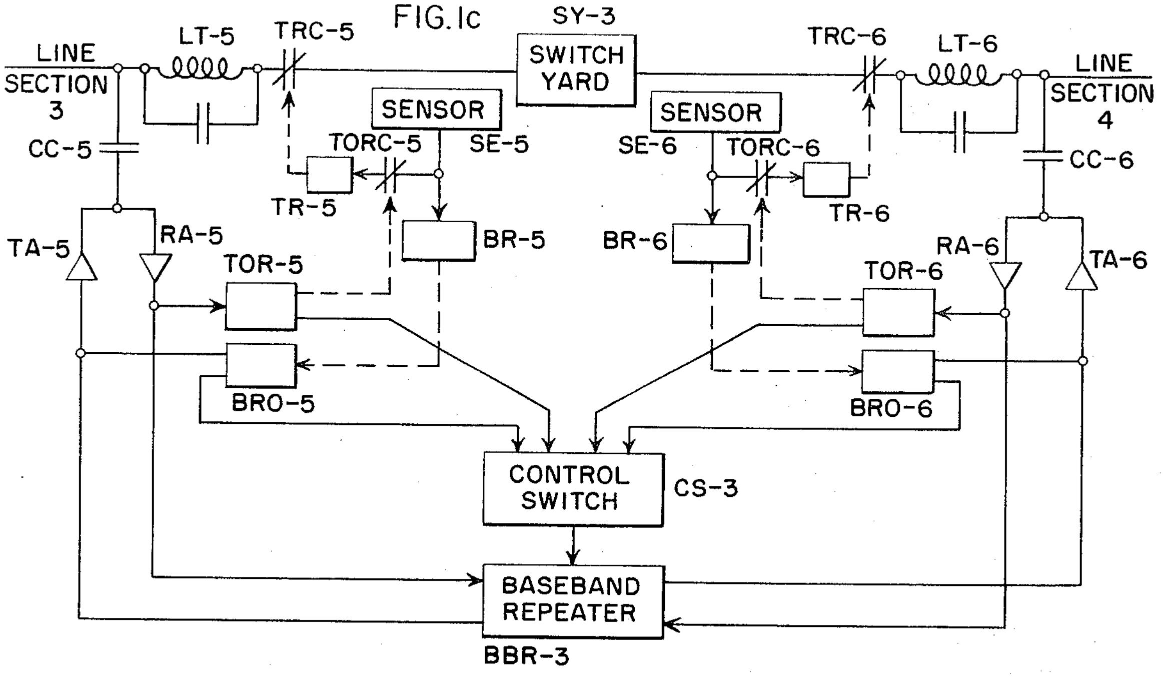

FIGS. 1*a*, 1*b*, and 1*c* are to be considered together, with FIG. 1*a* positioned at the left and connected by line section 2 to FIG. 1*b* positioned in the middle; and with FIG. 1*b* connected by line section 3 to FIG. 1c positioned at the right. The FIGURES so connected and as shown are representative of a typical 60 Hz (or other frequency in that region) power line transmission system. At the left of FIG. 1*a*, a line section 1, which may extend to a distant location or which may be connected to terminal apparatus, is connected through a line trap LT–1 and a trip relay contact TR–1 to a switchyard SY–1. On the right of FIG. 1*a*, the switchyard SY–1 is connected through a trip relay contact TRC–2 and a line trap LT–2 to a line section 2. The line traps LT–1 and LT–2 are known devices comprising a parallel resonant inductor and capacitor which block power line carrier frequencies in the kilohertz region, but which pass power frequencies in the 60 Hz region with very little attenuation or loss. The line section 1 is connected through a high voltage coupling capacitor CC–1 to a receiving amplifier RA–1 and to a transmitting amplifier TA–1. These amplifiers RA–1, TA–1 are connected to a baseband repeater BBR–1. The repeater BBR–1 is connected through a transmitting amplifier TA–2 and a receiving amplifier RA–2 to a coupling capacitor CC–2 which is connected to line section 2. Thus, carrier signals from line section 1 are blocked by the line trap LT–1 but pass through the coupling capacitor CC–1, amplified by the receiving amplifier RA–1, amplified or repeatered by the repeater BBR–1 and supplied to line section 2 by the transmitting amplifier TA–2 and the coupling capacitor CC–2. In the other direction, carrier signals from the line section 2 are connected by the coupling capacitor CC–2 to the receiving amplifier RA–2, repeatered by the repeater BBR–1, amplified by the transmitting amplifier TA–1, and applied by the coupling capacitor CC–1 to the line section 1. The baseband repeater BBR–1 may have an output and input for use at the location of the switchyard SY–1. The carrier system is blocked from the switchyard SY–1 by the line traps LT–1, LT–2, and the 60 Hz power system is blocked from the carrier amplifiers and repeaters by the coupling capacitors CC–1, CC–2. The only common parts of the carrier and 60 Hz power systems are the line sections. The 60 Hz power can be transmitted from line section 1 to the switchyard SY–1 where appropriate switching or other power functions may be provided, and then transmitted to the line section 2. Or, the 60 Hz power can be transmitted in the opposite direction from line section 2 through the switchyard SY–1 to line section 1.

In addition to these functions, a typical 60 Hz power switchyard, such as the switchyard SY–1, will have fault sensors SE–1, SE–2. The sensors SE–1, SE–2 are coupled to their respective line sections 1, 2 to provide fault signals in response to and for the duration of a current which exceeds a predetermined magnitude (a fault current). When a sensor detects such a condition, it produces fault signals which are applied to an associated blocking relay BR and to a tripping relay TR. The sensors SE–1, SE–2 are respectively connected through normally closed tone operated relay contacts TORC–1, TORC–2 to tripping relays TR–1, TR–2. The tripping relays TR–1, TR–2 can open (as indicated by the dashed lines) respective normally closed tripping relay (or circuit breaker) contacts TRC–1, TRC–2 in series with the line sections. The effect of or operation produced by these fault signals depends upon the direction of the fault current power flow. If the fault current power flows from the switchyard SY toward the line section with which the sensor SE is associated, the fault signals will prevent operation of the associated blocking relay BR and will, unless the contacts TORC are opened as explained subsequently, operate the associated tripping relay TR. If the fault current power flows from the line section with which the sensor SE is associated toward the switchyard SY, then the fault signals will only operate the associated blocking relay BR. Operation of a blocking relay BR causes an associated blocking relay oscillator BRO to supply a blocking tone of predetermined frequency to its associated line section. For example, if a fault develops in a line section to the left of switchyard SY–1, power flows from the switchyard SY–1 toward the fault. Under this condition, the fault signals produced by the sensor SE–1 cause the tripping relay TR–1 to operate after a slight delay if the contacts TORC–1 are closed, and block operation of the blocking relay BR–1. When the tripping relay TR–1 operates, it opens its associated contacts TRC–1 and disconnects line section 1 from switchyard SY–1. However, a blocking tone received from line section 1 will, as explained in more detail below, cause a tone operated relay TOR–1 to open its contacts TORC–1 so that the tripping relay TR–1 cannot respond to the fault signal. Thus, with respect to FIG. 1a, if a blocking tone is received from either line section 1 or line section 2, the respective receiving amplifier RA–1 or RA–2 applies this tone to a respective tone operated relay TOR–1 or TOR–2. These tone operated relays TOR–1, TOR–2 have respective tone operated relay contacts TORC–1, TORC–2 which are normally closed. However, if a blocking tone is received from line section 1 for example, the tone operated relay TOR–1 causes the associated contact TORC–1 to open so that the fault signal from the sensor SE–1 cannot operate its associated tripping relay TR–1. Thus, receipt of the tone in that example would prevent the tripping relay contacts TRC–1 from opening. Similarly, the contacts TRC–2 would be kept closed by a blocking tone from line section 2.

FIGS. 1*b* and 1*c* each have similar apparatus connected in a similar manner. Corresponding apparatus in FIGS. 1*b* and 1*c* is given the same letter designation, but is given a different numerical suffix in order to distinguish it from apparatus in other figures. For example, the sensor SE–4 is similar to the sensors SE–1 or SE–2; and the tone operated relay TOR–5 is similar to the tone operated relays TOR–1 or TOR–2. The apparatus of FIGS. 1*a*, 1*b*, and 1*c* as described thus far are known in the art, and provide protective relaying as will be explained.

In this explanation, we have assumed by way of example, that only line section 2 is subjected to a fault condition, such as being hit by lightning or a momentary grounding or shorting of its wires. From a power distribution standpoint, it is desirable that only line section 2 be removed from the remainder of the system, and that all fault-free line sections 1, 3, 4 and others be kept operative. This will be achieved as explained. With the fault condition in line section 2, power flows from the left through the line section 1 and the switchyard SY–1 toward the fault, and from the right through the line section 4, the switchyard SY–3, the line section 2 and the switchyard SY–2 toward the fault. The sensors SE–2, SE–3, SE–5 on the side of the respective switchyards nearest the fault produce fault signals that will operate their respective tripping relays TR–2, TR–3, TR–5 (unless the contacts TORC–2, TORC–3, TORC–5 are opened), and fault signals that prevent operation of their respective blocking relays BR–2, BR–3, BR–5. Hence no blocking tones are applied by the oscillators BRO–2, BRO–3, BRO–5 so that the contacts TORC–2, TORC–3, TORC–4 remain closed. The sensors SE–1, SE–4, SE–6 on the side of the respective switchyards farthest from the fault produce fault signals that cause their respective blocking relays BR–1, BR–4, BR–6 to operate. Operation of the blocking relays BR–1, BR–4, BR–6 cause the blocking relay oscillators BRO–1, BRO–4, BRO–6 to supply blocking tones (at the proper carrier frequency) to the line sections 1, 3, 4. The blocking tone applied to line section 1 by the oscillator BRO–1 is received at a location to the left (and not shown). This causes the associated tone operated relay TOR to open its associated contacts TORC and prevent the associated tripping relay TR from operating. Thus, line section 1 would be kept intact. Similarly, the blocking tone applied to line section 3 by the oscillator BRO–4 is received by the relay TOR–5. This relay TOR–5 opens the contacts TORC–5 so that the tripping relay TR–5 cannot operate in response to the fault signal from the sensor SE–5. Thus, the line section 3 would be kept intact. The blocking tone applied to line section 4 by the oscillator BRO–6 is received by a relay TOR at a location to the right (and not shown). This causes that relay TOR to open its associated contacts TORC and prevent the associated tripping relay TR from operating. Thus, line section 4 would be kept intact. In summary, all line sections other than line section 2 would be kept intact. Since no blocking tones would (or could because of the fault) be received by the relays TOR–2, TOR–3, the contacts TORC–2, TORC–3 would remain closed. After elapse of the operate time of the tripping relays TR–2, TR–3 (10 milliseconds for example), these relays TR–2, TR–3 would operate and open their respective contacts TRC–2, TRC–3. Thus, the line section 2 is removed by opening of the tripping relay contacts TRC–2 and TRC–3. All other tripping relay contacts TRC remain closed so that all other line sections remain operative or in service. When the fault is cleared, the sensor fault signals are terminated, and the system is restored to normal.

In the above example, it will be recalled that when a fault developed in line section 2, the sensor SE–5 produced a fault signal which would have operated the tripping relay TR–5, except for the fact that the contacts TORC–5 were opened in response to the blocking tone transmitted from the oscillator BRO–4 to the relay TOR–5. This same tone is applied to the baseband repeater BBR–3, and would be transmitted by the repeater BBR–3 and the transmitting amplifier TA–6 to line section 4. Such transmission is undesirable, as it could cause some erroneous operation of the protective relaying to the right of line section 4. Previously, some isolation was provided by each of the oscillators BRO having a distinct frequency. However, this required narrow band filters for the tone operated relays TOR. In some instances, particularly where there were many line sections, there would not be a sufficient number of distinct blocking frequencies or bandwidth for the frequencies.

This problem is overcome in accordance with our invention by the provision of a control switch CS for blocking each of the repeaters BBR under fault conditions. With reference to FIG. 1a, a control switch CS–1 having four inputs is provided for the baseband repeater BBR–1. Similar switches CS–2, CS–3 are provided for the repeaters BBR–2, BBR–3. The switch CS–1 is arranged so that if a signal is received at any of its four inputs, it turns the repeater BBR–1 off by blocking or short-circuiting both outputs as will be explained. The first input of the control switch CS–1 is connected to an output of the oscillator BRO–1; the second input is connected to an output of the tone operated relay TOR–1; the third input is connected to an output of the tone operated relay TOR–2; and the fourth input is connected to an output of the oscillator BRO–2. In a preferred embodiment to be discussed, we have assumed that the control switch CS–1 produces a blocking signal when any one or more of its inputs receives a signal of minus 10 volts. Thus, the relays TOR–1, TOR–2 and the oscillators BRO–1, BRO–2 are arranged so that when they are operated by a tone or relay respectively, they produce the minus 10 volts as well as their contact function or their oscillator function. However, persons skilled in the art will appreciate that the control switch CS–1 can be arranged so as to be operated in response to the mechanical actuation of the tone operated relays TOR–1, TOR–2, or in response to the tones produced by the oscillators BRO–1, BRO–2, or in response to mechanical actuations and tones.

Figure 2:
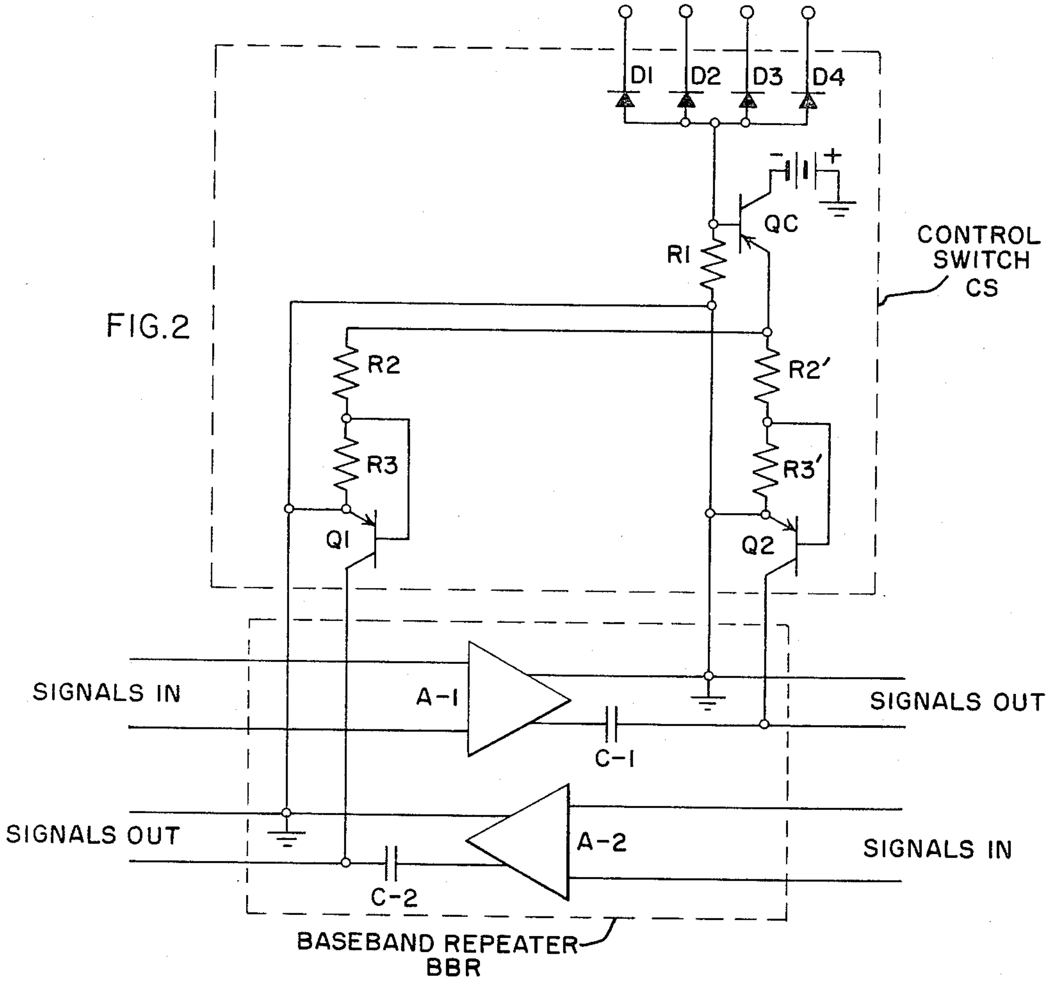
FIG. 2 shows a circuit diagram of one embodiment of our control switch for use with the repeaters of FIGS. 1*a*, 1*b*, and 1*c*.

In FIG. 2, we have shown a circuit diagram of a preferred embodiment of a control switch CS in accordance with our invention as used with a baseband repeater. The control switch and the baseband repeater are enclosed in respective dashed line rectangles. Typically, such a repeater comprises two separate amplifiers A–1, A–2, one for each direction. One wire or side of each of the outputs of the amplifiers A–1, A–2 is connected to a point of reference potential or ground. The other side of each of the outputs of the amplifiers A–1, A–2 has a blocking capacitor C–1, C–2 connected in series to prevent external direct current from reaching the amplifier output. In accordance with our invention, we short-circuit the output of these amplifiers A–1, A–2 in response to operation of the control switch. In the control switch, the four inputs are shown at the top of the dashed line rectangle. These inputs are connected through isolating diodes D1, D2, D3, D4 to the base electrode of a control transistor QC which is of the PNP type. The collector is connected to the negative terminal of a source of direct current. The positive terminal of the source is connected to ground. The base of the transistor QC is connected through a resistor R1 to the emitters of two blocking transistors Q1, Q2 which are also of the PNP type. The emitter of the transistor QC is connected through a series resistor R2 to the base of the transistor Q1 and through a series resistor R2′ to the base of the transistor Q2. The emitters of the transistors Q1, Q2 are respectively connected to the grounded outputs of the amplifiers A–1, A–2, and the collectors are respectively connected to the ungrounded outputs of the amplifiers A–1, A–2. In the absence of a negative signal at all of the control switch inputs, all the transistors QC, Q1, Q2 are turned off. When a negative signal is received at any one of the four inputs to the control switch, the transistor QC is turned on. Conduction of the transistor QC applies a negative voltage to the bases of the transistors Q1, Q2. This causes the transistors Q1, Q2 to present a short-circuit between their respective emitters and collectors, since the transistors actually act as two diodes. Each of the transistors Q1, Q2 is of the PNP type, with the base electrode being of the N type so that when that base electrode receives a negative voltage, the emitter to base circuit and the collector to base circuit appear as two conductive diodes. Thus, the transistors Q1, Q2 operating in this saturated mode offer such a low impedance that the outputs of the two amplifiers A–1, A–2 are short-circuited so that no signals pass through these amplifiers during the time that a negative signal is applied to any of the inputs to the control switch. Thus, the amplifiers are blocked, and erroneous protective relaying signals are prevented from passing through each of the baseband repeaters BBR whenever an associated tone operated relay TOR or blocking relay oscillator BRO is operated. When the input signal is removed (as a result of the relays TOR and oscillators BRO returning to normal), the repeater BBR is unblocked.

It will thus be seen that our invention provides a new and improved blocking arrangement for use in repeatered power line carrier systems that provide protective relaying. Our arrangement requires only the addition of a control switch for each baseband repeater. The control switch introduces no attenuation or transient conditions, but blocks only blocking tones during a fault signal. We prefer that our control switch be operated in response to any one of the four signals (whatever type they may be) produced by the two associated tone operated relays TOR and blocking relay oscillators BRO. The type of signals used to operate our switch can, of course, be varied by persons of ordinary skill. Further, the actual switch and blocking arrangement can be varied. Therefore, while our invention has been described with reference to a particular embodiment, it is to be understood that modifications may be made without departing from the spirit of the invention or from the scope of the claims.

What we claim as new and desire to secure by Letters Patent of the United States is:

1. In a power line carrier system having a first receiver connected through a repeater to a first transmitter and a second receiver connected through said repeater to a second transmitter, said first receiver having its input and said second transmitter having its output connected to a first transmission line and said second receiver having its input and said first transmitter havings its output connected to a second transmission line, a first tone responsive device connected to the output of said first receiver and adapted to provide an indication of said first receiver receiving a tone, a second tone responsive device connected to the output of said second receiver and adapted to provide an indication of said second receiver receiving a tone, a first tone oscillator connected to the input of said first transmitter for applying a tone to said second transmission line in response to a fault condition on said first transmission line, a second tone oscillator connected to the input of said second transmitter for applying a tone to said first transmission line in response to a fault condition on said second transmission line, the improvement comprising:

a. switching means having four inputs and an output for producing a blocking signal at said output in response to at least one of said oscillator tones or in response to at least one of said indications at any of said four inputs;
b. means for connecting one of said switching means inputs to said first tone responsive device;
c. means for connecting one of said switching means inputs to said second tone responsive device;
d. means for connecting one of said switching means inputs to said first tone oscillator;
e. means for connecting one of said switching means inputs to said second tone oscillator;
f. and means for connecting said switching means output to said repeater for blocking transmission through said repeater in both directions in response to receipt of an oscillator tone or in response to receipt of an indication at a respective one of said switching means inputs.

* * * * *